April 7, 1942. H. J. GRAHAM 2,279,232
SELECTIVE CONTROL APPARATUS
Filed Jan. 23, 1939 7 Sheets-Sheet 2

Inventor:
Harold J. Graham
Attys

April 7, 1942.  H. J. GRAHAM  2,279,232
SELECTIVE CONTROL APPARATUS
Filed Jan. 23, 1939  7 Sheets-Sheet 3

Inventor:
Harold J. Graham

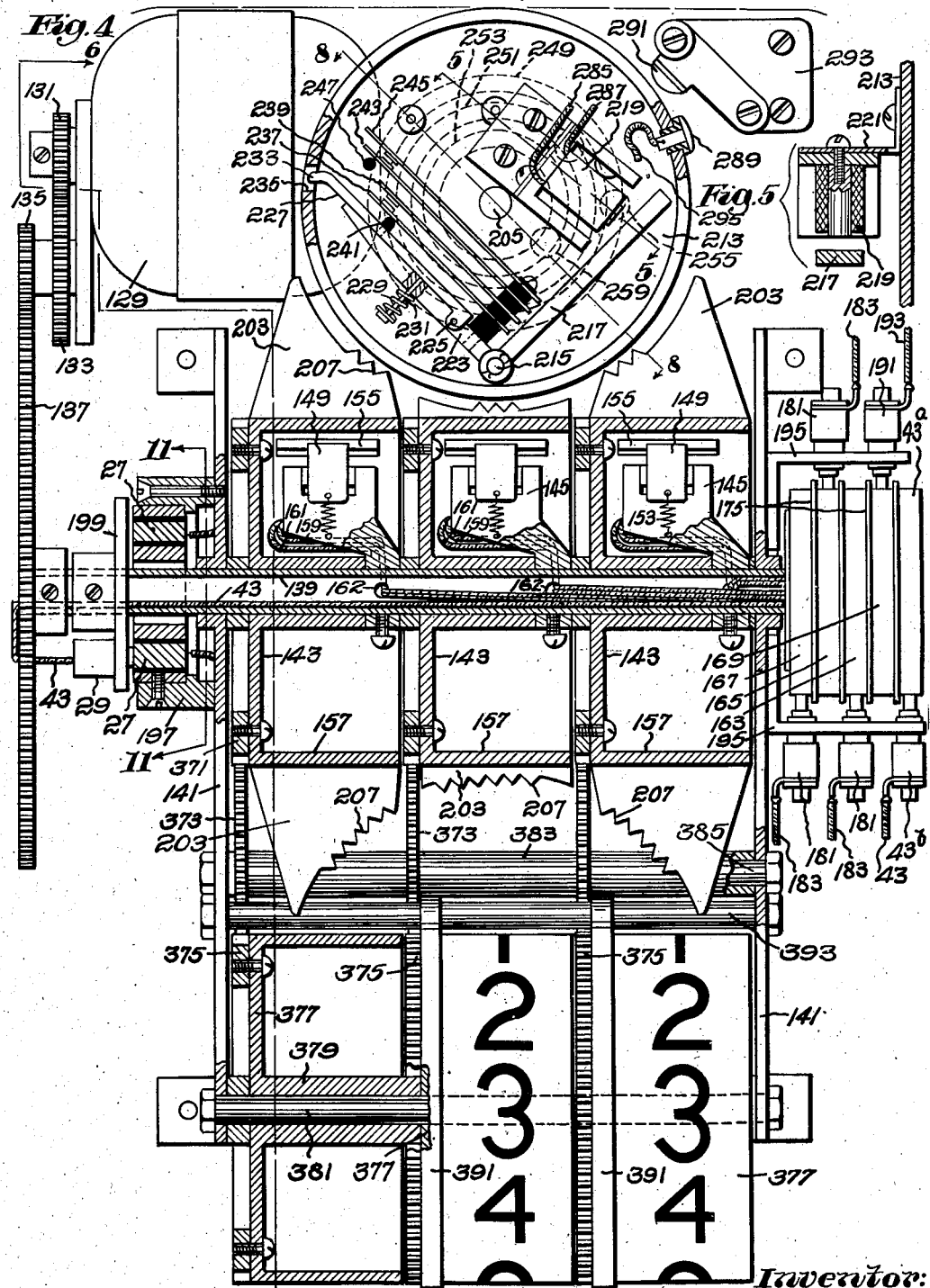

April 7, 1942.  H. J. GRAHAM  2,279,232
SELECTIVE CONTROL APPARATUS
Filed Jan. 23, 1939  7 Sheets-Sheet 5
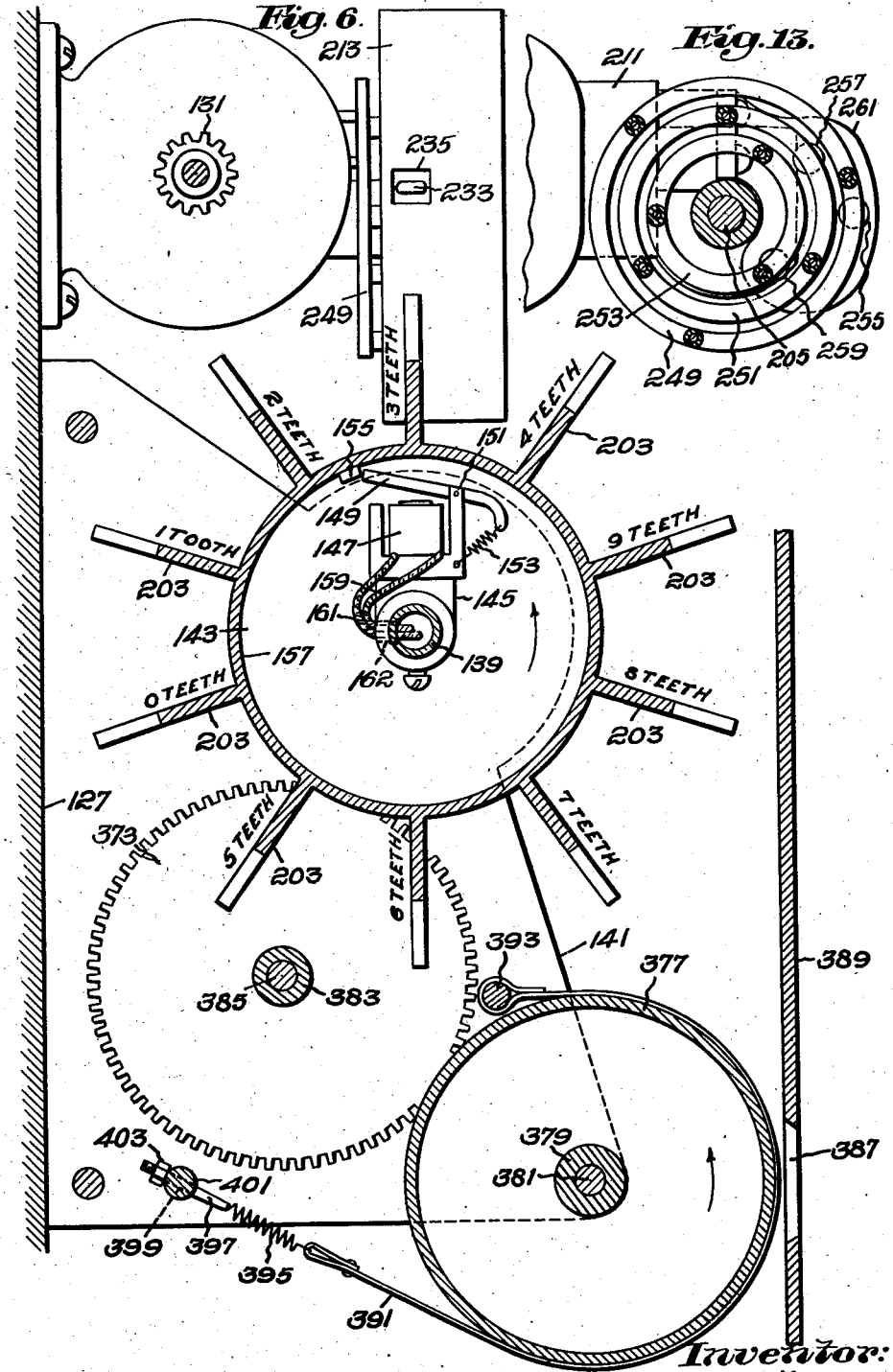
Inventor:
Harold J. Graham,
By Emery, Booth, Townsend, Miller & Widner Attys

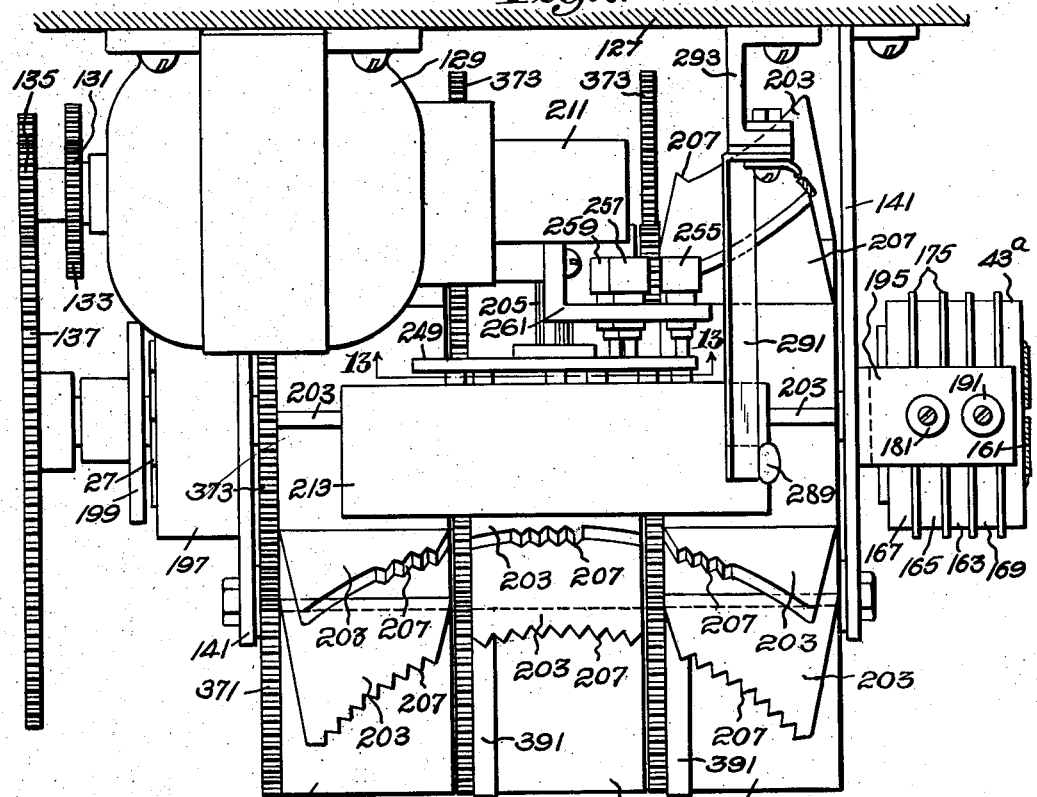

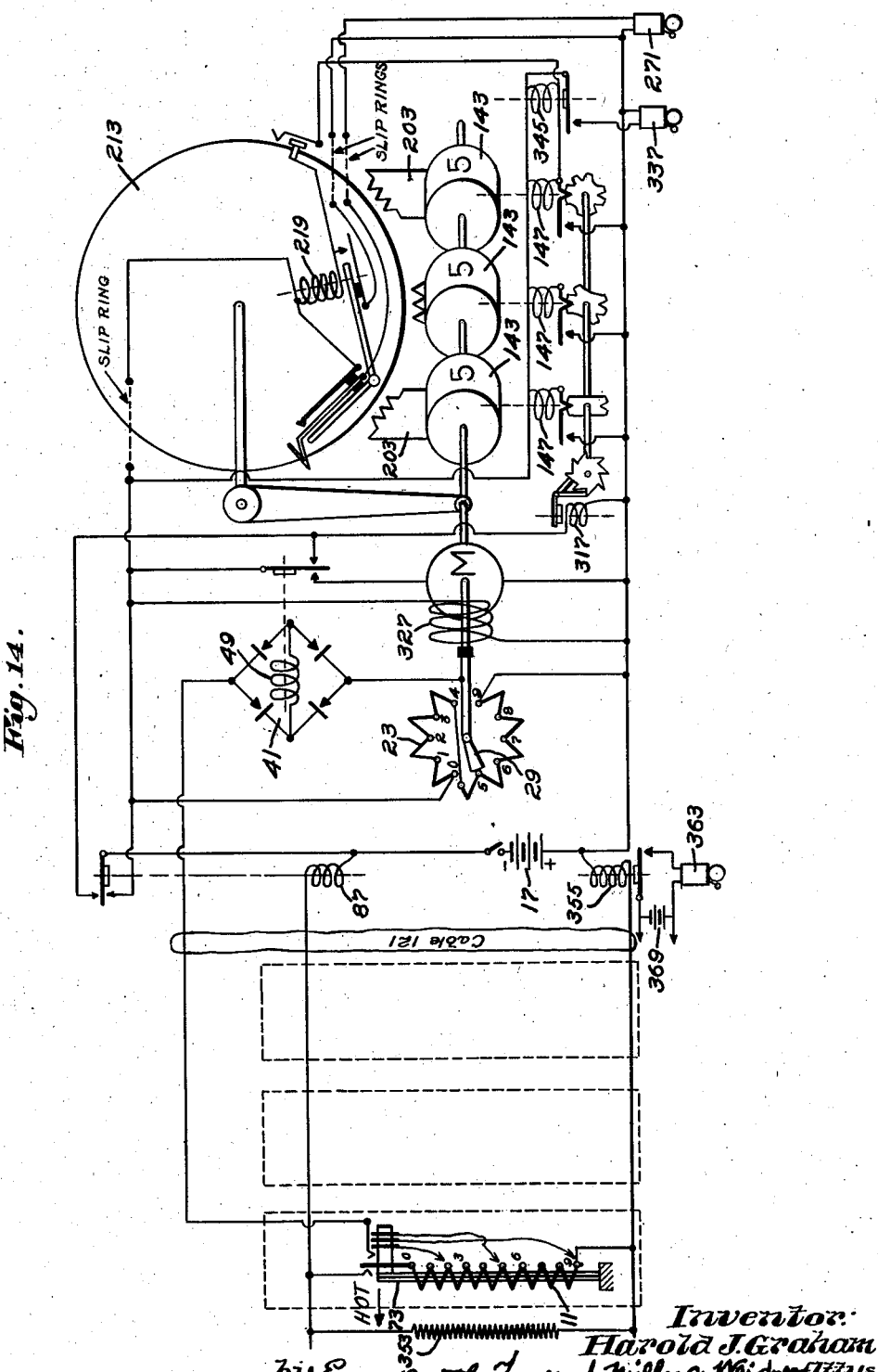

Patented Apr. 7, 1942

2,279,232

UNITED STATES PATENT OFFICE 2,279,232

SELECTIVE CONTROL APPARATUS

Harold J. Graham, Boston, Mass., assignor to
Louis Letterman, Winthrop, Mass.

Application January 23, 1939, Serial No. 252,262

8 Claims. (Cl. 177—353)

My invention relates to selective control apparatus as, for example, but without limitation thereto, electric fire alarm or other signaling systems.

The invention, which has among its objects the provision of apparatus of the kind above referred to having a minimum amount of wiring and instrumentalities, will be best understood from the following description when read in the light of the accompanying drawings of a signaling system according to the invention, the scope of which latter will be more particularly pointed out in the appended claims.

In the drawings:

Fig. 4 is an elevation, with parts in section, of an instrumentality employed in connection with the circuit schematically shown by Fig. 1;

Fig. 5 is a section on the line 5—5 of Fig. 4 showing a detail;

Fig. 6 is a section on the line 6—6 of Fig. 4 with parts omitted and parts in elevation;

Fig. 7 is a plan of the instrumentality according to Fig. 4;

Fig. 8 is a section on the line 8—8 of Fig. 4 with parts omitted;

Fig. 9 is an end view, looking toward the left, of the collector rings positioned at the right hand sides of Figs. 4 and 7;

Fig. 10 is a section on the line 10—10 of Fig. 9;

Fig. 11 is a section on the line 11—11 of Fig. 4;

Fig. 12 shows a detail;

Fig. 13 is a section on the line 13—13 of Fig. 7; and

Fig. 14 is an "across-the-line diagram" showing a simplified schematic circuit diagram of the circuit according to Fig. 1.

In order that the operation of the submitted embodiments of the invention may be more readily followed the schematic circuit arrangement according to Fig. 2 will first be explained.

Figure 2:
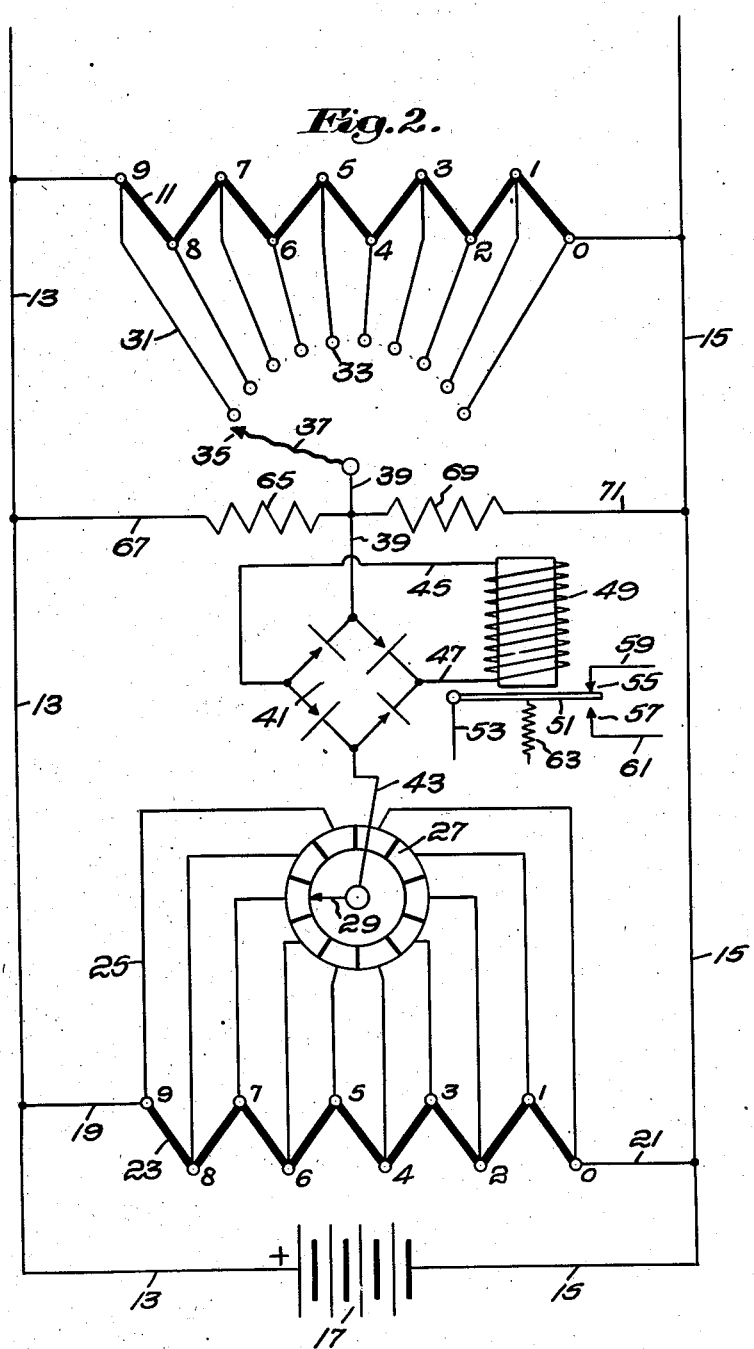
Fig. 2 is a schematic circuit diagram of an elementary part of the circuit according to Fig. 1.

As shown in Fig. 2, a tapped resistance 11 is connected by leads 13 and 15 to the opposite terminals respectively of a suitable source of direct or alternating electromotive force exemplified by the battery 17. Connected across this source of electromotive force in parallel with the tapped resistance 11 by the leads 19 and 21 is a second tapped resistance 23.

As shown, leads 25 connect the several taps, numbered 0 to 9 inclusive, of the resistance 23 to the several segments 27 of a stationary commutator having a cooperating rotary brush 29. Extending from each of the several taps, numbered 0 to 9 inclusive, of the resistance 11 are leads 31 connected to the several contacts 33, associated with which contacts is a contactor, indicated diagrammatically at 35, at the end of a flexible lead 37 so that the contactor may be placed selectively on any one of the contacts 33.

As shown, the flexible lead 37 is connected by a lead 39 to the upper input terminal of a bridge or other suitable current rectifier 41, the lower input terminal of which is connected by a lead 43 to the rotating brush 29. The opposite output terminals of the rectifier, as shown, are connected by leads 45 and 47, respectively, to the opposite terminals of the coil of an electro-magnetic relay 49. As shown, this relay has an armature 51 in electrical communication with a lead 53, and is adapted to be moved to contact alternately with the contact points 55 and 57 at the ends of leads 59 and 61 respectively so as to place the lead 53 in electrical communication with the lead 59 when the relay is energized and when it is deenergized to permit a spring 63 to place the armature 51 in contact with the point 57 for placing the lead 53 in electrical communication with the lead 61.

As shown in Fig. 2, the lead 39 is connected through a resistance 65 and lead 67 to the lead 13, and is connected to the lead 15 through a resistance 69 and lead 71.

As hereinafter explained, the relay 49 is arranged to act as part of a control device, movement of the armature 51 of the relay being effective to cause the control device to cause a plurality of movable parts to be arranged in relative selected positions. Specifically in the submitted embodiment of the invention hereinafter described the plurality of movable parts move with the rotating brush 29, and the relay 49 is operated when the brush is in selected positions determined by the contact points 33 with which the contactor 35 is caused to contact.

It will be observed that the resistances 11 and 23 serve as voltage dividers, and, that by having each resistance tapped in the same way, correspondingly numbered taps on the two resistances will be at the same voltage.

With the parts in the condition shown in Fig. 2 there will be a constant potential impressed on the upper input terminal of the rectifier, which potential will be half that of the battery 17 if the values of the resistances 65 and 69 are the same. The lower input terminal of the rectifier when the brush 29 is rotating will be at a varying potential caused by the brush wiping over the segments 27 of the commutator. The potential difference impressed on the input terminals of the rectifier therefore constantly varies, and alternates with each half revolution of the brush 29. The rectifier however changes this alternating electromotive force to a direct electromotive force to keep the relay 49 constantly energized.

If the contactor 35 under the conditions explained in the preceding paragraph is placed on one of the switch points 33 the potential difference across the input terminals of the rectifier will be zero when the brush 29 contacts with the commutator segment connected to the corresponding tap of the resistance 23. For example, if the contactor 35 is placed on the switch point 33 connected to the tap 6 of the resistance 11 the potential difference across the input terminals of the rectifier will be zero when the brush 29 contacts with the segment connected to the tap 6 of the resistance 23. When the potential difference across the input terminals of the rectifier is zero the relay 49 will be momentarily deenergized, permitting the spring 63 to draw the relay armature 51 downward to make it contact with the switch contact point 57, under which conditions the control device will be operated.

It will be observed that by successively causing the contactor 35 to contact with different contact points 33 the relay 49 will be successively operated when the brush arm is successively in predetermined positions determined by the particular contacts 33 with which the contactor 35 contacts. It will also be observed that whenever the contactor 35 is moved out of contact with a contact 33 the parts will be in the condition illustrated in Fig. 2 and the relay will again be energized to move the armature 51 into contact with the switch contact point 55.

It also will be observed that when the contactor 35 is placed on a contact 33 the resistances 65 and 69 will be in parallel with the corresponding portions of the resistance 11 at opposite sides of the tap to which the contact is connected. By having the resistances 65 and 69 of high value as compared to the value of the resistance 11 only a slight difference in the potential impressed on the upper input terminal of the rectifier will be caused over that which would be caused by the voltage divider afforded by the resistance 11 in absence of the resistances 65 and 69. This error may be compensated for by causing the taps on the resistance 23 irregularly to divide that resistance. For example, if the total value of each resistance 11 and 23 is 100 ohms and the value of each resistance 67 and 69 is 500 ohms, the taps of the resistance 11 may divide that resistance into ten sections each of 10 ohms, and the error caused by the resistances 65 and 69 may be compensated for by making the resistance between the taps numbered 8 and 9 and those numbered 0 and 1 of the resistance 23 each about 11.1 ohms, with the remaining sections of the resistance 23 between adjacent taps progressively decreasing toward the value 10 ohms as the center of the resistance 23 is approached, as will be clear to those skilled in the art.

It will further be observed that, if a source of alternating electromotive force is employed in place of the battery 17, suitable impedances may be employed in place of the resistance sections of the resistances 11 and 23, and that in either case the operation of the relay 49 is independent of fluctuations in the value of the potential of the source of electromotive force. Also it will be observed that tapped batteries could be employed in place of either or both the resistances 11 and 23. Still further, the relay 49 need not be arranged to operate at zero potential, but may be designed to operate at any convenient predetermined potential difference.

Figure 1:
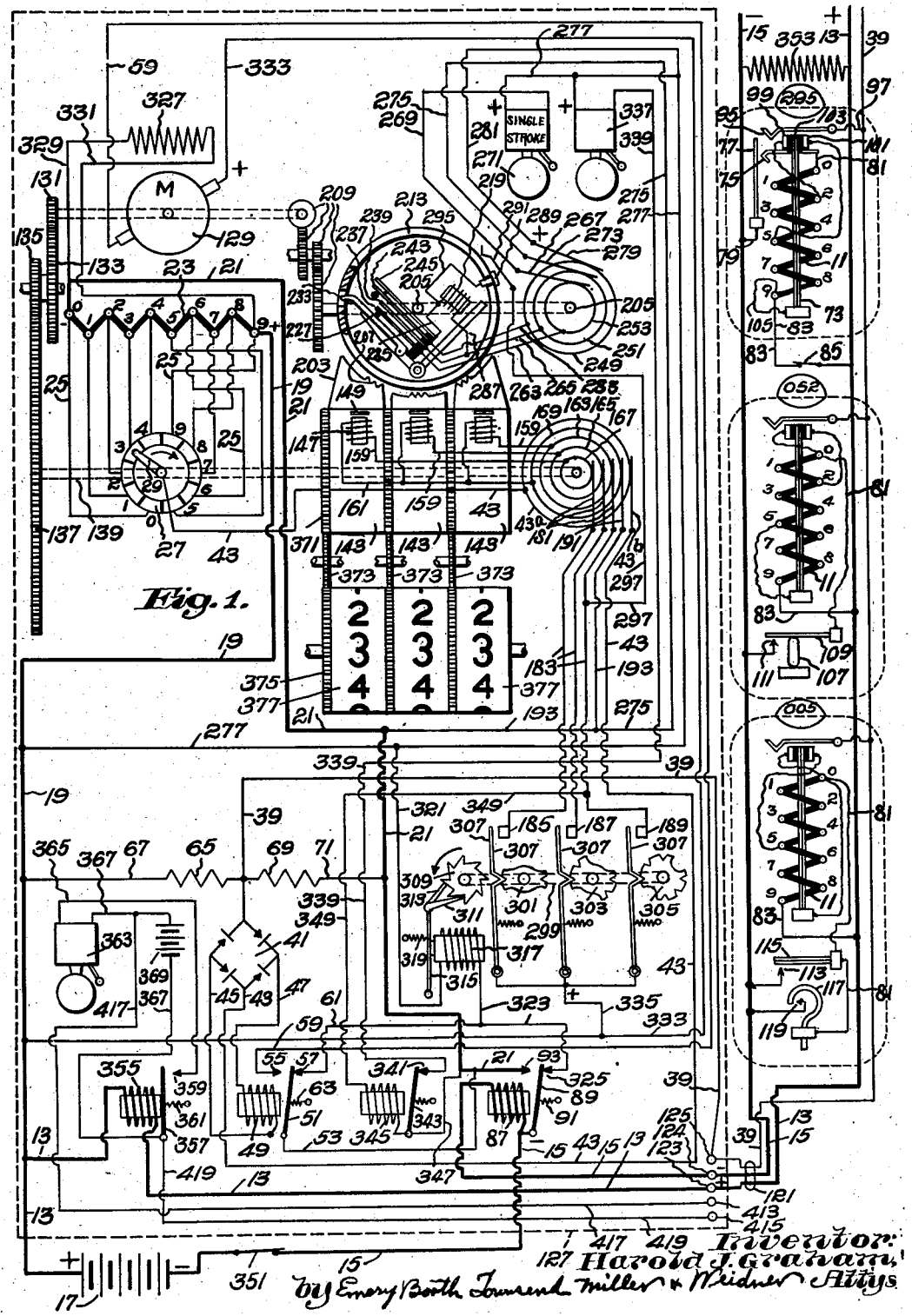
Figure 1 is a schematic circuit diagram of apparatus according to the invention.

In Fig. 1 is shown an adaptation of the elementary circuit according to Fig. 2. The same reference characters are applied to Fig. 1 as to Fig. 2, and the arrangement is the same except that the leads 67 and 71 in Fig. 1 are connected to the leads 19 and 21 respectively instead of to the leads 13 and 15 as in Fig. 2, but electrically one is the same as the other, as will be clear from an inspection of Fig. 2.

In Fig. 1 a plurality of the resistances 11 are provided adapted to be connected across the battery leads 13 and 15. As shown, these resistances 11 are part of thermostatic devices of a fire alarm or other system.

As diagrammatically illustrated in Fig. 1, each resistance 11 is in the form of a flexible coil wrapped about a flexible bi-metallic thermostatic element 73. Referring to the thermostatic device shown at the upper right hand corner of Fig. 1, the thermostatic element 73 at its upper end carries in insulated relation thereto a contact arm 75 which, when the element 73 flexes on account of being heated by the presence of a fire, is caused to contact with the yieldable spring arm 77, the latter being connected to the negative lead 15 of the battery 17 by a lead 79. The upper end of the resistance 11 is connected by a lead 81 to the contact arm 75, while the lower end of the resistance is permanently connected by a flexible lead 83, having therein a manually controlled switch 85, to the positive lead 13 of the battery 17. Consequently when the contact 75 touches the arm 77, if the switch 85 is closed, which it normally is, the resistance 11 will be connected across the battery 17.

In the negative battery lead 15 is the coil of a relay 87. The armature 89 of this relay, which armature is electrically permanently connected to the lead 15, is drawn to the left against the resistance of the spring 91 upon the current flowing through the lead 15 consequent upon the resistance 11 being connected across the battery as above explained. Drawing the armature to the left causes it to contact with the switch point 93 so as to connect the lead 21 to the lead 15 and thus connect the tap numbered 0 of the resistance 23 to the negative terminal of the battery 17. The tap numbered 9 of the resistance 23, like the tap numbered 9 of the resistance 11, is permanently connected to the positive terminal of the battery, that tap of the resistance 23 being so connected through the leads 19 and 13. Hence, when the resistance 11 is connected across the battery by the occurrence of a fire, the resistance 23 is caused automatically to be connected across it.

Referring again to the upper thermostatic device shown in Fig. 1, the same comprises a flexible contact arm 95 connected by a lead 97 to the lead 39 running to the upper input terminal of the current rectifier 41.

At its upper end in insulated relation thereto and to each other the thermostatic element 73 carries a pair of spaced contacts 99 and 101, the upper end 103 of the thermostatic element also constituting a contact positioned between these other contacts in spaced insulated relation to them. These three contacts, as shown, are separately connected by suitable flexible leads 105 to selected taps on the resistance 11, for example, as shown in the upper thermostatic device, to the contacts numbered 2, 9 and 5.

When a fire causes the thermostatic element 73 to flex sufficiently for the contact 75 to touch the flexible arm 77, and thus connect the resistance 11 across the battery leads 13 and 15, the current caused to flow through the resistance will heat it and cause the thermostatic element further to flex, and as a result successively cause the contacts 99, 103 and 101 in the order named to wipe across the contact 95, the arm 77 flexing during this operation. This of course is the equivalent of touching the contactor 35 of Fig. 2 (which corresponds to the contact 95 of Fig. 1) successively to three switch points 33 of Fig. 2, namely, as shown in Fig. 1, those which are connected to the contacts 2, 9 and 5 of the resistance 11.

The middle thermostatic device of Fig. 1 is similar to the one just described except that the resistance 11 thereof is connected across the battery leads 13 and 15 upon rupture of the explosive bulb 107 upon the occurrence of a fire, which rupture allows the spring arm 109 to close the switch 111 and thus connect the lead 81, running from the zero tap of the resistance 11, to the battery lead 15.

In place of the switch 75, 77 of the upper thermostatic device of Fig. 1 a separate thermostat may be employed for initially connecting the resistance 11 across the battery leads 13 and 15. This arrangement is shown in the lower thermostatic device of Fig. 1, which is provided with a thermostatic switch 113 having a bi-metallic element 115 which will cause the switch to close and connect the zero contact of the resistance 11 to the negative battery lead 15 upon the occurrence of a fire.

It will be understood of course that the thermostatic device can be responsive to conditions other than fires as, for example, as shown in connection with the lower thermostatic device of Fig. 1, a Bourdon tube or the like 117 may be connected to a pressure system as, for example, a sprinkler system. In such case, if the pressure of the system drops, the tube will close the switch 119 and connect the zero tap of the resistance 11 to the negative battery lead 15 through the lead 81, as heretofore.

It will be observed that as many as one thousand thermostatic devices 11 may be associated with the battery leads 13 and 15 and the current rectifier lead 39, each of which devices, in a manner hereinafter explained, may be caused to indicate a separate signal corresponding to the station at which the thermostatic device is placed as, for example, a stateroom of a ship. However, when the audible signals are to be sounded numbers having a zero following a digit must be omitted. As illustrated, the three thermostatic devices shown have their taps connected to indicate the numbers 295, 52, and 5, respectively.

As shown in Fig. 1, the leads 13, 15 and 39 common to the several thermostatically operated devices are arranged in the form of a cable 121 connected to the binding posts 123, 124 and 125, respectively, at the lower right hand corner of a panel indicated by the dotted lines 127, on which panel is conveniently mounted the relay having the coil 87, hereinbefore referred to, and the associated instrumentalities of the apparatus.

Referring to Figs. 4 to 13 as well as to Fig. 1, on the panel 127 is mounted a motor 129 connected through reduction gearing comprising the train of gears 131, 133, 135 and 137 to a hollow shaft 139 mounted for rotation in the spaced frame members 141.

On the shaft 139 and between the frame members 141 are shown three spaced drums 143, and fixed to the shaft interiorly of each of the drums is a support 145. Each support 145, as shown, carries an electro-magnet 147 having a cooperating armature 149 (Fig. 6) pivotally supported on the support at 151, a spring 153 normally holding the armature outward so that its end normally engages with a lug 155 on the interior of the skirt 157 of the drum. When the shaft 139 is rotated in the direction of the arrow shown by Fig. 6 each drum 143 will rotate with it if the electro-magnets 147 associated with the drums are deenergized. When an electro-magnet is energized to draw the armature out of contact with the lug 155 the associated drum will be disconnected from the shaft and stand stationary.

As clearly shown in Figs. 4 and 6, energizing leads 159 and 161 extend from the electro-magnets 147 through perforations 162 in the support 145 and shaft 139 to the interior of the latter. These leads extend to the several collector rings 163, 165, 167 and 169, as schematically illustrated in Fig. 1, and as structurally illustrated in Figs. 4, 6, 9 and 10.

As shown, the collector rings just referred to are mounted on the exterior of a cylindrical sleeve 171 of insulating material (Figs. 9 and 10) fixed by the set screw 173 to the end of the shaft 139 so as to rotate therewith, each ring being separated by an annular disk 175 of insulating material. Through the sleeve extend bars 177 of conductive material, there being one bar for each collector ring. Each collector ring is electrically connected to a separate bar 177 by a pin 179 screw-threaded in the collector ring and extending through the sleeve 171 into contact with the bar. The ends of the leads 159 are each connected to a separate bar 177, as shown in Fig. 9, while the three leads 161 are connected to another of these bars so as to form the common lead 161 shown in Fig. 1.

Brushes 181 (Figs. 1 and 4) cooperating with the collector rings 163, 165 and 167 have connected thereto leads 183 (Fig. 1) which extend severally to the contacts 185, 187 and 189 of a sequence switch hereinafter explained. The brush 191 cooperating with the collector ring 169, to which latter the common lead 161 for all the electro-magnets 147 is connected, is connected by a lead 193 to the lead 21 so that when the relay 87 is energized to throw the resistance 23 across the battery the electro-magnets 147 will be in condition to be energized by the selective switch just referred to.

The lead 43 running from the commutator brush 29 also extends through the hollow shaft 139 and is connected to the collector ring 43$^a$. Cooperating with this collector ring is a brush 43$^b$ to which is connected a continuation of the lead 43, which continuation connects with the lower input terminal of the rectifier 41.

As shown, the several brushes 181, 191 and 43ᵇ cooperating with the collector rings above referred to are carried by brackets 195 in insulated relation thereto and to each other, which brackets are carried by the adjacent frame member 41, as illustrated by Figs. 4 and 7.

The stationary commutator having the segments 27 hereinbefore referred to is carried by a casing 197 secured to the adjacent frame member 141, the brush 29 being carried, in any suitable manner, by a plate 199 in insulated relation thereto, the plate being fixedly secured to the shaft 139 so that when the latter rotates the brush will wipe over the segments 27. The casing 197, as shown in Fig. 11, is provided with an opening 201 through which the leads 25 from the segments 27 extend to the taps on the resistance 23.

As illustrated in Fig. 1, the segments 27 are preferably so connected to the taps that when the brush bridges the insulation between two adjacent segments it is possible for the brush to short circuit only a portion of the resistance 23. This is preferably done to prevent momentarily short circuiting the battery, which would occur when the brush is on the segments connected to the taps numbered 8 and 9 if the segments were connected to the taps in the manner shown by Fig. 2. In this connection it will be obvious from Fig. 2 that the brush 29, if narrow enough to contact the insulation between adjacent segments without contacting either of those segments, would, when it is on only the insulation, momentarily cause the relay 49 to be deenergized. For that reason the brush is made wide enough to bridge the insulation, as is indicated in Fig. 1.

As shown, each drum 143 has ten flattened, radially projecting arms 203 presenting faces which are concentric with a shaft 205 when in a plane transverse to that shaft. The faces of each arm 203 are provided with projecting teeth 207, nine of the arms on each drum being provided with one to nine teeth, respectively, the teeth being entirely omitted from the tenth arm. The drums are arranged to be stopped in selected positions to present to the actuating part of the switch rotated by the shaft 205 selected series of teeth for sounding an alarm as, for example, when arranged in positions caused by the upper thermostatic device of Fig. 1 to sound the alarm represented by the numerals 2-9-5, and when arranged in positions caused by the lower thermostatic device of that figure to sound the alarm represented by the numeral 5.

The shaft 205 is driven through suitable reduction gearing, indicated schematically at 209 in Fig. 1, driven by the motor 129, this reduction gearing being housed by the casing 211 (Fig. 7) carried by the motor and forming no part of the invention. The ratio of the gearing and speed of the motor however are such as to rotate the drum 213 carried by the shaft 205 once in about fifty seconds, the shaft 139 rotating at about 200 R. P. M.

Referring particularly to Figs. 4, 5, 8 and 13, and the wiring diagram of Fig. 1, the drum 213 (as shown) interiorly thereof carries a projecting pin 215 on which is mounted a bell crank lever, one arm 217 of which latter forms an armature cooperating with an electro-magnet 219 carried by a bracket 221 fixed to the drum. The arm 223 of the bell crank lever has pivoted thereto at 225 a switch actuating arm 227, a spring 229 acting on a short rod 231, which latter extends through a perforation in the arm 223 and is connected to the arm 227, acting yieldingly to hold the latter against the former. As shown, the arm 227 has an end portion 233 adapted to extend through a perforation 235 in the peripheral portion of the drum when the electro-magnet 219 is energized to draw the arm 217 of the bell crank lever toward the electro-magnet and hold it there. When the arm 227 is in this latter position the rotating drum causes the end portion 233 of the arm to ride over the teeth 207 positioned on the drums 143, and in this way open and close the contact points of the spring switch blades 237 and 239 carried by the arm 223, there being for that purpose interposed between the arm 227 and the switch blade 237 a block 241 of insulating material carried by the arm 227 and contacting with the switch blade 237. The switch afforded by the blades 237 and 239 (as shown) controls a single stroke bell circuit so as to tap off numbers as the end 233 of the arm 227 rides over the teeth 207.

Also carried by the arm 223 is a switch having the spring blades 243 and 245. When the electro-magnet 219 is energized to draw the arm 217 toward it the switch blade 243 strikes a post 247 of insulating material fixedly carried by and projecting from the drum 213 so as to close the switch afforded by the blades 243 and 245 and establish a holding circuit for maintaining the electro-magnet 219 energized.

As illustrated in Figs. 4, 8 and 13, the drum 213 at its rearward side carries in insulated relation thereto and to each other three collector rings 249, 251 and 253 with which cooperate brushes 255, 257 and 259, respectively, (Figs. 7 and 13), the brushes, as shown, being carried by an arm 261 carried by the motor casing 211.

As shown in Fig. 1, the switch blades 237 and 239 are connected by leads 263 and 265 to the collector rings 253 and 251, respectively. The brush 267 cooperating with the collector ring 253 is connected by a lead 269 to the negative terminal of a single stroke alarm bell 271, while the brush 273 cooperating with the collector ring 251 is connected by a lead 275 to the lead 193, which latter is connected to the lead 21, the lead 21 being connected to the negative terminal of the battery when the relay having the coil 87 is closed upon occurrence of a fire. Consequently, when the end 233 of the arm 227 rides over the teeth 207 successively to open and close the switch provided by the spring arms 237 and 239, the negative terminal of the single stroke bell will be alternately connected to and disconnected from the negative terminal of the battery to complete the bell circuit because the positive terminal of the bell is permanently connected by a lead 277 to the positive battery lead 19.

The brush 279 cooperating with the collector ring 249 is connected by a lead 281 to the lead 277, which latter, as above explained, is permanently connected to the positive terminal of the battery, the collector ring being connected by a lead 283 to the switch blade 243. The switch blade 245 cooperating with the blade 243 is connected by a lead 285 to one terminal of the electro-magnet 219, the other terminal of which is connected by a lead 287 to the lead 265 which, as before explained, by means of the collector ring 251, brush 273 and lead 275 is connected to the negative terminal of the battery when the device is in operation when a fire or the like occurs.

Hence, when the switch blades 243 and 245 are in closed relation, the electro-magnet will be energized to keep the arm 217 (Fig. 4) drawn toward it.

As shown (Fig. 4), the peripheral portion of the drum 213 carries in insulated relation thereto a pin 289 adapted during rotation of the drum momentarily to contact with the switch blade 291 carried by a bracket 293 in insulated relation thereto, the bracket being carried by the panel 127, as shown by Figs. 7 and 12. The terminal of the electro-magnet 219 which is connected to the switch blade 245 is also connected by a lead 295 to the pin 289, as shown in Fig. 1. The switch blade or brush 291 which cooperates with this pin is connected by a lead 297 to that one of the leads 183 which extends to the contact 189 of the sequence switch, this contact being the contact of the switch last connected to the positive terminal of the battery during the operation of the apparatus. Contact of the pin 289 with the brush arm 291 thus will cause one terminal of the electro-magnet 219 to be connected to the positive side of the battery, the other terminal of the electro-magnet, as above explained, being connected to the negative side of the battery when a fire occurs, and therefore, as operation of the sequence switch causes the drums 143 successively to cease rotating as the contacts 185, 187 and 189 of the sequence switch are successively connected to the positive battery terminal by such operation, the single stroke bell will not begin to tap until all the drums 143 cease rotating.

The sequence switch having the contacts 185, 187 and 189 is of known construction schematically shown by Fig. 1. It comprises a shaft 299 on which are fixedly mounted notched cams 301, 303 and 305 each controlling a spring switch blade 307. Fixed on the shaft is a ratchet wheel 309 adapted to be turned step by step by a cooperating pawl 311, a holding pawl 313 being also provided. The pawls are suitably operatively mounted on a pivoted armature 315 of an electro-magnet 317, a spring 319 retracting the armature to cause the pawl 311 to engage the next successive tooth when the armature is deenergized so that when it is again energized the ratchet wheel will be rotated through one tooth. In this way the sequence switch causes the three switch blades 307, respectively, to contact with the contacts 185, 187 and 189 successively when the device is operated to turn the ratchet wheel step by step from its position shown in Fig. 1, in which position the blades are out of contact with all the contacts. The arrangement and construction of the cams are such that four successive energizations of the electro-magnet will cause the shaft 299 to be rotated through 180°, with the result that when all the blades are in contact with the contacts the next energization of the electro-magnet will move all of them out of contact, that is to say, move the blades again into their positions shown by Fig. 1.

It will be observed that, as shown in Fig. 1, the electro-magnet 317 has one terminal permanently connected by a lead 321 to the lead 277, which latter is permanently connected to the positive side of the battery by the leads 19 and 13. The other terminal of the electro-magnet is connected by a lead 323 to the switch point 325 of the relay having the armature 89, which armature is connected to the negative battery lead 15. Hence in the normal condition of the apparatus the electro-magnet 317 is energized to hold the ratchet wheel 309 in the position in which all the switch blades 307 are out of contact with their cooperating contacts 185, 187 and 189.

When a fire or the like occurs the following operations take place:

(1) Assuming, for convenience of description, that the fire occurs at the station at which is situated the upper thermostatic device of Fig. 1, the heat of the fire will cause the associated thermostatic element 73 to flex, which in turn will cause the contact 75 to move into contact with the spring arm 77 and establish a circuit through the associated tapped resistance 11, as hereinbefore has been explained. Placing the resistance 11 in circuit in this way will establish a flow of current from the positive terminal of the battery through the leads 13 and 83 to the end tap 9 of the resistance, and from the end tap 0 of the resistance to the negative terminal of the battery through the switch 75, 77 and leads 79 and 15, in which latter lead is placed the coil of the relay 87. Flow of current through the coil of the relay 87 will energize that relay and cause the armature 89 to move into contact with the switch point 93, the armature being held in that position for the duration of the fire, or at least for as long as the resistance 11 remains in circuit.

(2) When the armature 89 is moved by operation (1) away from the contact 325, the circuit through the electro-magnet 317 of the sequence switch is interrupted, causing the spring 319 to move the armature 315 to the left to position the pawl 311 to grip the next tooth of the ratchet wheel 309 so that the shaft 299 will be turned to cause the left hand switch arm 307 to contact with the contact 185 when the sequence switch is again energized.

(3) Moving the armature 89 by operation (1) against the switch point 93 connects the resistance 23 across the battery 17 by way of the leads 15 and 21 and the leads 13 and 19. The field winding 327, which is connected by the leads 329 and 331 in parallel with the resistance 23, is by the same operation also connected across the battery.

(4) When the resistance 23 is energized the brush 29 through the lead 43, in which latter are the collector ring 43ᵃ and brush 43ᵇ, impresses a potential on the lower input terminal of the rectifier 41. At the same time the upper input terminal of the rectifier is connected to both the positive and negative sides of the battery, being connected to the positive side through the resistance 65 and leads 67, 19 and 13, and to the negative side through the resistance 65, leads 71 and 21, switch point 93, armature 89, and lead 15. The rectifier is therefore energized and energizes the coil 49 which moves the armature 51 into contact with the switch point 55.

(5) The armature 51 being connected by the lead 53 to the lead 21, which latter has been connected by operations (1) and (3) to the negative terminal of the battery, causes one terminal of the armature of the motor 129 to be connected by operation (4) to the negative terminal of the battery through the switch point 55 and lead 59. The other terminal of the motor armature is permanently connected to the positive side of the battery by the leads 333, 19 and 13, hence the motor 129, as a result of operation (4), starts rotating and that rotates all the drums 143.

(6) As hereinbefore explained, connecting the resistance 11 in circuit heats it to cause continued flexure of the thermostatic elements 73, so as to wipe the contacts 99, 103 and 101 successively in the order named over the switch arm 95 while the drums are rotating. When the contact 99 wipes over the arm 95 it impresses a certain voltage on the lead 39, which voltage, as hereinbefore explained, is determined by the tap on the resistance 11 to which the contact 99 is connected. That voltage is impressed on the upper terminal of the current rectifier 41 by the lead 39. When the relatively rapidly rotating brush arm 29 selects the same voltage and impresses it upon the lead 43, and hence on the lower input terminal of the current rectifier, the relay coil 49 is deenergized, the spring 63 drawing the armature 51 of that relay away from the contact point 55 to break the armature circuit of the motor 129 to cause the drums 143 to stop rotating. The armature 51 by contacting with the contact 57 causes the electro-magnet 317 of the sequence switch to be again energized because one terminal of that magnet is permanently connected with the positive side of the battery 17, as hereinbefore explained, while its other terminal is connected by the leads 323 and 61, armature 51, leads 53 and 21, armature 89, and lead 15 to the negative side of the battery. It will be observed that as a result of operations (1) and (3) the motor 129 and the resistance 11 of the thermostatic switch are substantially simultaneously energized. This causes the motor to rotate while the resistance 11 acts as a heating coil to heat the thermostatic element 73 to cause continued flexure of the latter, which flexure successively wipes the contacts 99, 103 and 101 over the switch arm 95. Should the lug or projection 155 of any drum 143 be out of engagement with the associated armature 149 when the motor starts rotating it will be moved into such engagement by the rotation of the motor before the contact 99 contacts with the switch arm 95.

(7) Hence as the result of operation (6), when the brush 29 selects the same voltage as is selected by the contact 99 of the thermostatic switch, the motor 129 is stopped from rotating and the ratchet wheel 309 of the sequence switch is moved through a distance of one tooth to cause the switch blade 307 at the left as viewed in Fig. 1 to contact with the contact 185. All the switch blades 307 are connected by a lead 335 to the lead 333, which latter is connected to the positive side of the battery. Therefore, when the contact 185 is contacted, the positive side of the battery is connected to that contact and from there through the connected lead 183, associated brush 181, collector ring 167, and lead 159 to one terminal of the electro-magnet 147 of the left hand drum 143 of Figs. 1 and 4. The other terminal of this electro-magnet is connected by the lead 161, collector ring 169, brush 191, leads 193 and 21, armature 89, and lead 15 to the negative side of the battery. Therefore the electro-magnet 147 of the left hand drum 143 is energized to disconnect that drum from the shaft 139 when the motor 129 stops rotating on account of the contact 99 of the thermostatic device contacting with the arm 95.

(8) As soon as the thermostatic element 73 moves far enough to move the contact 99 past and out of contact with the arm 95 the current rectifier 41 is again energized (operation (4)) to cause the armature 51 of the relay 49 to move to the left as viewed in Fig. 1, which deenergizes the electro-magnet 317 of the sequence switch, causing the spring 319 to retract the pawl 311 to grip a new tooth, as explained in connection with operation (1), the switch blade 307 which cooperates with the contact 185 of the sequence switch remaining in closed condition to keep the left hand electro-magnet 149 energized. When the relay 49 is thus energized its armature 51 again closes against the switch point 55 and causes the armature of the motor 129 again to be energized (operation (5)) and that motor to rotate the middle and right hand drums 143, the left hand drum now remaining stationary.

(9) When the thermostatic element flexes further to cause the contact 103 to wipe over the arm 95, operations (6) and (7) are repeated, except that the middle drum 143 of Fig. 1 is stopped instead of the left hand drum by reason of the switch arm of the sequence switch cooperating with the contact 187 moving against that contact. As soon as the continued flexure of the thermostatic element 73 moves the contact 103 beyond the contact portion of the arm 95 operation (8) is repeated, again to rotate the right hand drum 143.

(10) The operations above explained continue until the third right hand drum 143 is stopped from rotating when the contact 101 of the thermostatic device contacts with the arm 95. When this contact moves beyond and out of contact with the arm 95 the motor 209 will again rotate, but all the drums 143 will then be stationary. The drum 213 however will continue to rotate.

(11) When the sequence switch closes the last contact 189 thereof to stop the third drum 143, the brush 291 associated with the drum 213 will be connected to the positive side of the battery 17 through the lead 297, the lead 193, contact 189, switch blade 307, and leads 335, 333, 19 and 13. Therefore, as soon as the pin 289 contacts with the brush 291, that terminal of the electro-magnet 219 which is connected by the lead 295 to the pin 289 will be connected to the positive terminal of the battery. The other terminal of this electro-magnet is connected to the negative terminal of the battery by the leads 287 and 265, collector ring 251, brush 273, leads 275 and 21, armature 89, and lead 15. Hence the electro-magnet 219 will be energized to draw toward it the armature 217 (Fig. 6). Such operation of the armature 217 will close the contact points of the switch blades 243, 245, the latter of which blades is connected by the lead 285 to the terminal of the electro-magnet 219 to which the pin 289 is connected, while the switch blade 243 is connected to the positive side of the battery by the lead 283, collector ring 249, brush 279, and leads 281, 277, 19 and 13. Hence the electro-magnet 219 will remain energized. Energizing the electro-magnet, as hereinbefore explained, causes the end 233 of the arm 227 to project from the periphery of the drum 213 and ride over the teeth 207 of the radial arms 203 on the drums 143. Also, as hereinbefore explained, this causes the switch arms 237, 239 to open and close and thus cause the single stroke bell 271 to tap off signals.

(12) Conveniently, an alarm bell 337 is provided which sounds continuously upon energization of the relay 87 upon the occurrence of a fire. One terminal of this bell is permanently connected to a positive terminal of the battery. The other terminal is connected by a lead 339 to the contact point 341 cooperating with the armature 343 of a relay 345, that armature being connected by a lead 347 to the lead 21, which latter is placed by the relay 87 in communication with the negative battery lead 15 when a fire occurs, as hereinbefore explained in connection with operations (1) and (2). Therefore, when the relay 87 is first energized to draw the armature 91 into contact with the switch point 93, the lead 339 is connected to the negative terminal of the battery by way of the armature 343, leads 347 and 21, armature 89, and lead 15. That causes the bell 337 to sound. When the last contact 189 of the sequence switch is connected to the positive side of the battery (operation (11)), for causing the single stroke bell 271 to be sounded, a current is established from the positive side of the battery, by way of the lead 183 connected to the contact 189, and the lead 349, to one terminal of the coil of the relay 345, the other terminal, as just explained, being connected to the negative side of the battery. Hence the armature 343, when all the drums have stopped rotating and the single stroke bell is about to sound, is drawn away from the contact 341 to interrupt the circuit through the bell 337.

(13) When the thermostatic device flexes sufficiently to move the contact 101 past the contact arm 95 (operation (10)), the sequence switch will be energized (operation (8)) to cause it to make one stroke, which will return that switch to its position of parts shown by Fig. 1. The motor 129 however continues to rotate, and the bell to sound, until the battery switch 351 is opened or the switch 85 associated with the thermostatic device is opened.

As illustrated in Fig. 1, the remote end of the battery leads 13, 15 are bridged by a high resistance 353 which causes a current of low value continually to flow through those leads, this current not being of great enough value to operate the relay 87. Interposed in the lead 13 however is an extremely sensitive relay 355 having an armature 357 cooperating with a switch point 359, the sensitivity of this relay being such that the small current flowing is effective to hold the armature 357 out of contact with the switch point 359. If the circuit should be interrupted through the battery 17 or either of the leads 13 and 15, or the cable 121 should become broken, the relay 355 will deenergized to permit the spring 361 to draw the armature 357 into contact with the switch point 359 and cause an alarm bell 363 to sound. As shown, one terminal of this bell is connected by a lead 365 to the switch point 359, while the other terminal is connected to the armature 357 by a lead 367, in which latter is interposed the battery 369 so that the armature 357 and switch point 359 act as a switch to control the bell circuit.

As further illustrated in Figs. 1, 4, 6 and 7, each drum 143 has secured thereto a gear wheel 371 each of which meshes with a gear 373, the latter being in mesh with gears 375 carried by a second series of drums 377. The drums 377 are provided with hubs 379 rotatable on the stationary shaft 381 (Figs. 4 and 6) which is carried at opposite end portions of the frame members 141. Each gear 373 has a hub 383 (Figs. 4 and 6) which is mounted for rotation on a stationary shaft 385 carried at opposite ends thereof by the frame members 141.

As the gear wheels 371 and 375 have the same pitch diameters, the drums 377 will be rotated at the same speed as the drums 143. This construction enables the peripheries of the drums 377 to be placed close to the sight opening 387 (Fig. 6) of the cover 389 for the instrumentalities on the panel 127. These drums 377 have their peripheral portions provided with numerals or other indicia corresponding to the number of teeth 207 on the arms 203 of the drums 143, as indicated in Fig. 4. In this way when a fire occurs a visual signal is indicated, corresponding to the signal which is tapped by the bell 271.

As shown in Figs. 4 and 6, the drums 377 also serve as brake drums for insuring that each drum 143 will stop immediately upon its being disconnected from the shaft 139 when the armature 149 moves out of contact with the lug 155 on that drum 143. As illustrated, wrapped around each drum 377 is a flexible brake band 391, one end of each band being connected to a common stationary bar 393 carried at opposite ends thereof by the frame members 141. The opposite end of each brake band is shown as connected by a spring 395 (Fig. 6) to a pin 397, which latter extends through a perforation 399 in a bar 401 common to all the pins and carried at opposite end portions thereof by the frame members 141. The projecting end of each pin 397 remote from the spring 395 is screw-threaded and is provided with a nut 403 bearing against the rod 401, which construction enables the springs 395 to be tensioned for tensioning the brake bands.

In practice when the parts are in the position shown in Figs. 4 and 6 and the armature members 149 are against the lugs 155 to cause the drums 143 to rotate with the shaft 139, the arms 203 of the several drums having the same number of teeth 207 will be in alignment, and the brush 29, under these conditions, at any instant will be in contact with that commutator segment 27 which is connected to the tap of the resistance 23 of the same numeral as corresponds to the number of teeth on the arms 203 which are adjacent the drum 213. As the number of commutator segments are the same as the number of arms 203 on each drum 143, and have the same angular spacing, the drum can be disconnected from the shaft 139 only when a drum arm 203 adjacent the drum 213 has the same number of teeth as corresponds to that tap of the resistance 23 to which is connected the commutator segment 27 with which the brush 29 contacts. When the upper thermostatic device of Fig. 1, for example, is operated, and the taps of the associated resistance 11 are connected to the contacts 99, 103 and 101 as shown, the first or left hand drum of Figs. 1 and 7 will stop rotating and be disconnected from the shaft 139 when the arm 203 having two teeth is adjacent the drum 213, while the middle drum and left hand drums 143 will stop rotating and be disconnected when the arms having nine and five teeth, respectively, are adjacent the drum 213.

Commonly it is inconvenient to connect all the thermostatic devices to a single cable 121 as shown in Fig. 1. To obviate this the thermostatic devices may be connected in groups, say of 100 each for example, to different cables 405 as indicated in Fig. 3.

Preferably, when this is to be done, the cable 121 is disconnected from the binding posts 123, 124 and 125 of the panel 127 and a cable 407 connected to them, this cable also having a pair of wires 409 and 411 connected to the binding posts 413 and 415 respectively. The binding post 413 is shown in Fig. 1 as connected by the lead 417 to the lead 367 between the bell 363 and battery 369, while the binding post 415 is shown as connected to the armature 357, to which latter the lower terminal of that battery is connected; in other words, the binding posts 413 and 415 are connected to opposite terminals respectively of the battery 369. When the cable 407 is connected to the binding posts on the panel 127, the supervisory bell 363 will be disconnected so that the battery may actuate the supervisory signals for the thermostatic devices shown in Fig. 3.

Figure 3:
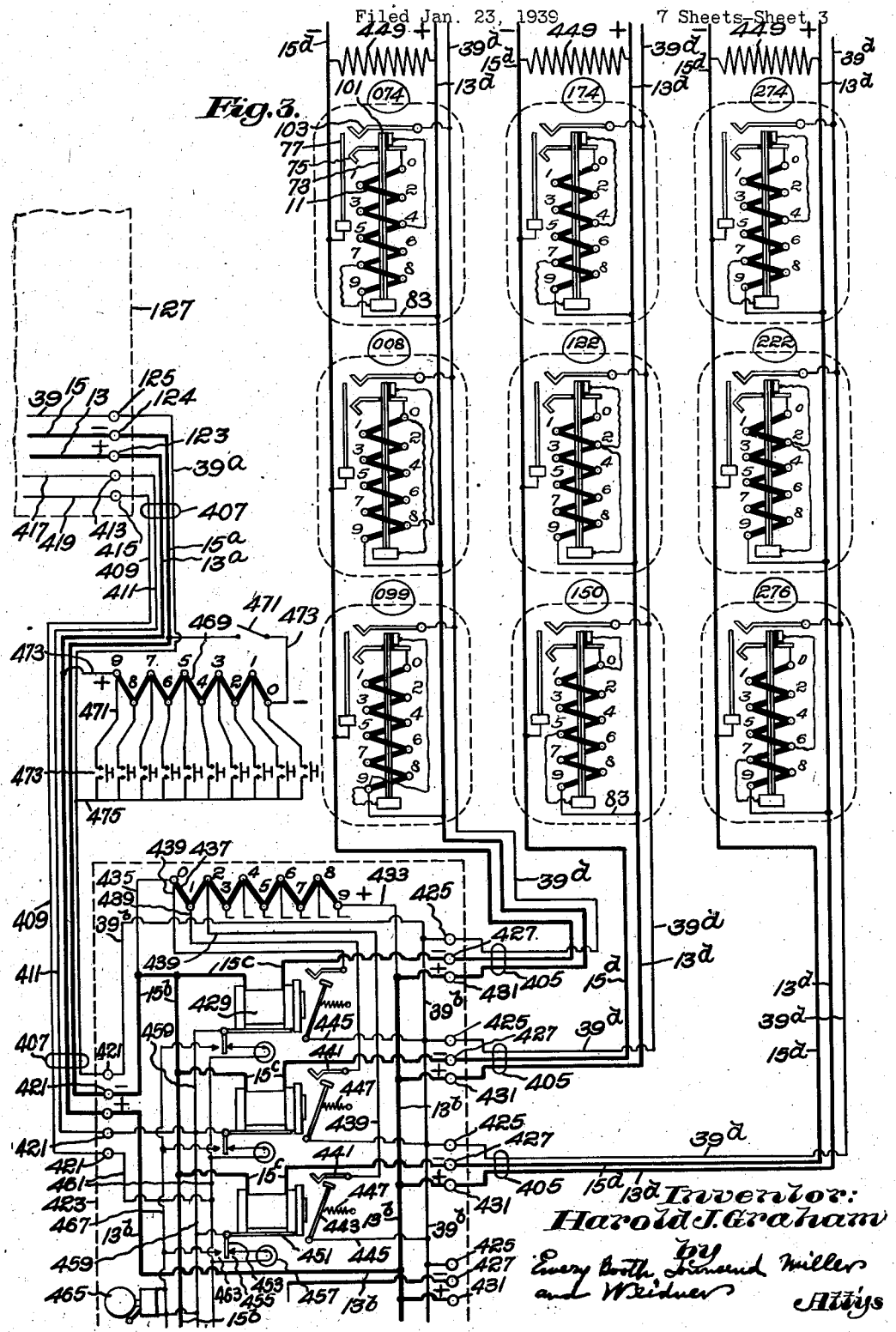
Fig. 3 is a schematic circuit diagram of a modified apparatus according to the invention.

As shown in Fig. 3, the leads 13$^a$ and 15$^a$ of the cable 407 connect with the positive and negative terminals respectively of the battery 17 on account of the fact that those terminals are connected to the binding posts 123 and 124 respectively. The lead 39$^a$ of the cable 407, which is connected to the binding post 125 of the panel 127 (Fig. 1), communicates with the upper input terminal of the current rectifier 41 because the lead 39 of Fig. 1 is connected to that binding post. In other words, the leads 13$^a$, 15$^a$ and 39$^a$ are adapted to serve the same purpose as the leads 13, 15 and 39 of Fig. 1.

As shown, the several wires of the cable 407 are connected to the several binding posts 421 on a panel 423. On this panel the wire 39$^a$ of the cable is continued by a wire 39$^b$ which has taps leading to binding posts 425, to which latter are connected in parallel the wires 39$^d$ of the several cables 405 leading to the groups of thermostatic devices.

The negative battery lead 15$^a$ of the cable 407 is continued on the panel 423 by a lead 15$^b$ which has various taps 15$^c$ leading to the binding posts 427 on that panel. In each of the leads 15$^c$ is inserted the energizing winding of a retarded relay 429. To the binding post 427 are connected in parallel the leads 15$^d$ of the cables 405.

The positive battery lead 13$^a$ of the cable 407 is continued on the panel 423 by a lead 13$^b$ which has taps leading to the binding posts 431 to which the leads 13$^d$ of the cables 405 are connected in parallel.

As shown in Fig. 3, bridged across the positive and negative battery leads 13$^b$ and 15$^b$ by means of the leads 433 and 435 respectively is a tapped resistance 437 identical electrically with the resistances 11 of the thermostatic devices. Tap leads 439 extend from the several taps of the resistance 437, each to a spring contact arm 441 associated with each armature 443 of the retarded relays 429. The armatures 443 are connected by separate leads 445 to the lead 39$^b$, springs 447 acting to hold the armatures in retracted positions.

The thermostatic devices to which the cables 405 of Fig. 3 lead are like those shown in Fig. 1 except that the contact 99 of Fig. 1 is omitted in each of them. When a fire occurs, and a thermostatic element 73 of Fig. 3 flexes to cause the associated contact 75 to engage with the flexible arm 77 and thus connect the associated resistance 11 across the associated battery leads 13$^d$ and 15$^d$, the high current set up in the lead 15$^b$ will energize the retarded relay 429 in the associated lead 15$^c$. Energization of the retarded relay will draw the armature 433 thereof relatively slowly toward the pole piece of the relay and wipe the end of the armature across the associated contact arm 441, so as to connect the associated tap lead 439 from the resistance 437 to the wire 39$^b$. In other words, as the lead 39$^b$ is a continuation of the lead 39 of Fig. 1, the armature 443 wiping across the contact arm 441 impresses a potential on the lead 39 just the same as one would be impressed upon it if the contact 99 of one of the thermostatic devices of Fig. 1 wiped over the contact 95 of that figure, and that will cause the same operation resulting in stopping of the first drum 143 because the current which actuates the retarded relay 15$^c$ also causes operation of the relay 87 of Fig. 1 in series with it.

With the above described arrangement each thermostatic device on a given cable 405 will when operated cause the first drum 143 to be stopped in the same position; in other words, the first numeral of the numbers caused to be indicated or sounded by any thermostatic device on a given cable 407 will be the same for each device, as is indicated in Fig. 3 by the numbers associated with the thermostatic devices on these cables.

As shown in Fig. 3, across each pair of battery leads 13$^d$ and 15$^d$ is a resistance 449 of high enough value to cause a feeble current to flow continuously through the relay 429 associated with that cable. This current is not strong enough to cause the relay to draw the armature 443 toward the adjacent relay pole piece, but is strong enough to hold the armature 451 in the position shown by the drawings, in which position the tail pieces 453 of the armatures are held against the associated switch points 455. Under these conditions lamps 457 are energized and illuminated by reason of the fact that each armature tail piece 453 is connected to a common lead 459, which latter is connected to that one of the binding posts 421 to which the lead 411 from one of the terminals of the battery 369 of Fig. 1 is connected, and one terminal of each lamp is connected to the adjacent switch point 455, while the other terminals of the lamps are connected to a common lead 461 connected to that binding post 421 which is connected to the lead 409 extending from the opposite terminal of the same battery. By reason of this construction, so long as the circuits are not interrupted through the battery leads of the several cables 405 all the lamps 457 will be illuminated, while if one of those circuits should be interrupted the corresponding lamp will be extinguished.

Also cooperating with each tail piece 453 of the armature 451 is a second switch point 463 with which the tail piece contacts when the relay 429 is deenergized upon interruption of the circuit in the associated leads 13$^d$ and 15$^d$ of the cable 405. When this occurs the continuously ringing bell 465 is energized and rings because one terminal of the bell is connected to the lead 459 which, as just explained, is in communication with one terminal of the battery 369 of Fig. 1, while the other terminal of the bell will, under such conditions, be connected by the lead 467, to which latter all the switch points 463 are connected, the armature tail piece 453 and lead 459 to the lead 411 extending to the other terminal of the battery 369.

It will be understood that in place of the thermostatically operated devices of Figs. 1 and 3 manually or otherwise controlled devices may be employed for successively positioning the drums 143. For example, as shown in Fig. 3, a tapped resistance 469, identical with one of the resistances 11, may be connected across the battery leads 13$^a$ and 15$^a$. As shown, each tap lead 471 from the resistance 469 has in it a push button 473, which push buttons may be used for selectively connecting the taps to a common lead 475 connected with the wire 39$^a$ leading to the upper input terminal of the rectifier 41 of Fig. 1. Successively operating these push buttons in selected order will actuate the apparatus to position the drums 143 to indicate and tap off numbers in the same way that the actuation of the thermostatic devices will. For example, if the push buttons in the leads from the taps 2, 9 and 5 are closed in the order named the drums 143 will be positioned to tap off the number 2-9-5 just the same as would actuation of the upper thermostatic device of Fig. 1. It will be understood therefore that the resistance having the taps controlled by the push buttons 473 may be substituted for the thermostatic devices to form an annunciator system. Also, if desired, the resistance having the push buttons may be connected as shown in Fig. 3 to act as a supervisory device for testing the apparatus. The resistance 469 may, if desired, be permanently in circuit, but to prevent current drain on the battery 17 a normally open manually operated switch 471 is preferably inserted in one of the leads 473 which connect the resistance across that battery.

It will be understood that, within the scope of the appended claims, wide deviations may be made from the forms of the invention herein described without departing from the spirit thereof.

I claim:

1. Apparatus comprising a plurality of rotatable members to be stopped in different selected relative positions having, in combination, stop means for successively causing cessation of rotation of said members, control means for successively operating said stop means responsive to a predetermined potential difference, which control means comprises a series of contacts and a cooperating contact engaging part, said series and part being relatively movable in definite timed relation to said members, means for establishing a different potential on each of different contacts of said series of contacts for varying the potential impressed on said part, primary means for successively selecting different potentials, and means for impressing on said control means the potential difference between the instant potential of said part and the instant potential selected by said primary means so that when said part and series of contacts are in a predetermined relative position to establish the predetermined potential which operates said stop means the latter will be operated to stop rotation of one of said members, whereby said members may be successively stopped upon said primary means being caused successively to select potentials.

2. Apparatus comprising a plurality of rotatable members to be stopped in different selected relative positions having, in combination, a stop means for each of said members operative to cause cessation of rotation thereof, switch means for successively causing operation of said stop means, means for operating said switch means comprising a commutator and a cooperating brush relatively rapidly rotated in definite timed relation to said members, means for establishing a different potential on each of different segments of said commutator for varying the potential impressed on said brush, a primary device for successively selecting different potentials, control means for said switch means responsive to a predetermined potential difference, electrical connections for impressing on said control means the potential difference between the instant potential on said brush and the instant potential selected by said primary device for causing said control means to effect operation of said switch means when said brush and commutator are in a predetermined relative rotative position to establish a predetermined potential difference between said brush and the instant potential selected by said primary device, whereby said members may successively be stopped upon said primary device being caused successively to select potentials.

3. Apparatus of the character described comprising a driving part; a plurality of members driven by said part; means for stopping movement of said part and interrupting the driving connection between it and one of said members and then continuing movement of the part for moving the remaining members, and repeating the operation until the driving connections of all said members are interrupted; a control means for said first mentioned means responsive to the impression thereon of a predetermined potential difference for stopping said part and interrupting said connections, and responsive to the impression thereon of other potential differences for causing movement of said part; and means for impressing said potential differences on said control means comprising a primary potential selecting device connected to one terminal of said control means for relatively slowly successively impressing thereon selected potentials, and a varying potential creating means for rapidly impressing on another terminal of said control means a potential varying with the position of said members, whereby by causing said primary potential selecting device successively to select potentials said members may be stopped in selected relative positions.

4. Apparatus according to claim 3 in which the potential selecting device comprises a voltage divider having a tapped resistance, and a relatively movable contactor cooperating with the taps of said resistance for successively selecting voltages and impressing them on a terminal of the control means.

5. In a signaling system, a plurality of potentiometer devices at different stations responsive to conditions thereat to be signaled, a central station, conductors common to all of said plurality of potentiometer devices and the central station, means at each potentiometer device actuated by the condition to be signaled for successively contacting selected points of the potentiometer to a certain one of said conductors, an indicating code signal device at the central station comprising a plurality of rotary members each adapted to be stopped in any of a plurality of predetermined positions for setting up different code indicia; and means at the central station responsive respectively to the points of the potentiometer successively contacted for stopping rotation of said rotary members, each respectively in one of said plurality of predetermined positions.

6. In a signaling system, a plurality of potentiometer devices at different stations responsive to conditions thereat to be signaled, a central station, conductors common to all of said plurality of potentiometer devices and the central station, means at each potentiometer device actuated by the condition to be signaled for successively contacting selected points of the potentiometer to a certain one of said conductors, an indicating code signal device at the central station comprising a plurality of rotary members each adapted to be stopped in any of a plurality of predetermined positions for setting up different code indicia; and means at the central station for successively stopping rotation of said rotary members, each respectively in one of said plurality of predetermined positions, upon the points of the potentiometer being successively so contacted comprising a device for rapidly impressing a series of potentials each of different value while each point of said potentiometer is contacted.

7. In a signaling system, a plurality of potentiometer devices at different stations responsive to conditions thereat to be signaled, a central station, conductors common to all of said plurality of potentiometer devices and the central station, means at each potentiometer device actuated by the condition to be signaled for successively contacting selected points of the potentiometer to a certain one of said conductors, an indicating code signal device at the central station comprising a plurality of rotary members each adapted to be stopped in any of a plurality of predetermined positions for setting up different code indicia; means at the central station for successively stopping rotation of said rotary members, each respectively in one of said plurality of predetermined positions, upon the points of the potentiometer being successively so contacted comprising a device for rapidly impressing a series of potentials each of different value while each point of said potentiometer is contacted, the respective values of the potentials of said series corresponding to substantially those established by the respective points of said potentiometer, and the last mentioned means being responsive to substantially a zero difference between a potential of said series of potentials and the respective different potentials successively impressed on said certain one of said conductors by the points of said potentiometer.

8. In a signaling system, a plurality of potentiometer devices at different stations responsive to conditions thereat to be signaled, a central station, conductors common to all of said plurality of potentiometer devices and the central station, means at each potentiometer device actuated by the condition to be signaled for successively contacting selected points of the potentiometer to a certain one of said conductors, an indicating code signal device at the central station comprising a plurality of rotary members each adapted to be stopped in any of a plurality of predetermined positions for setting up different code indicia, a cooperating commutator and brush at the central station relatively rapidly rotated in timed relation to said rotary members when the latter are rotated, means connecting the respective commutator segments to sources of potential each of different value, and means responsive respectively to predetermined differences between the potentials successively impressed on said brush by said commutator and those successively impressed on said certain one of said conductors by the points of said potentiometer for successively stopping rotation of said rotary members.

HAROLD J. GRAHAM.